United States Patent Office 3,097,133
Patented July 9, 1963

3,097,133
ANAESTHETIC 1:1:1:3:3:3-HEXAFLUORO-2-HALOPROPANE
Charles Walter Suckling, Widnes, and James Raventos, Macclesfield, England, assignors to Imperial Chemical Industries Limited, London, England, a corporation of Great Britain
No Drawing. Filed Dec. 2, 1960, Ser. No. 73,228
Claims priority, application Great Britain Dec. 21, 1959
7 Claims. (Cl. 167—52)

This invention relates to new compositions of matter and more particularly it relates to new inhalant anaesthetic compositions comprising 1:1:1:3:3:3-hexafluoro-2-chloropropane or 1:1:1:3:3:3-hexafluoro-2-bromopropane as the active anaesthetic agent.

The compounds 1:1:1:3:3:3-hexafluoro-2-chloropropane, B.P. 15° C. and 1:1:1:3:3:3-hexafluoro-2-bromopropane, B.P. 31° C. are known compounds. We have now found, and herein lies our invention, that the said compounds possess valuable physiological properties. They possess anaesthetic properties and are substantially free from undesirable side effects when administered as inhalant anaesthetics and are therefore useful for the production of anaesthesia in animals. These compounds have not yet been clinically demonstrated to be effective in humans.

According to the invention we provide inhalant anaesthetic compositions comprising a 1:1:1:3:3:3-hexafluoro-2-halopropane of the formula $CF_3CHXCF_3$, wherein X stands for a chlorine or a bromine atom, in admixture with oxygen in suitable proportions for the production of anaesthesia.

The said compositions may be used in any means according to the known art for the production of anaesthesia for example they may be used in apparatus or machines adapted for the vaporisation of low-boiling liquids and the admixture thereof with oxygen or with air or other gaseous mixtures containing oxygen in amount capable of supporting respiration. The inhalation anaesthetic agent, 1:1:1:3:3:3-hexafluoro-2-chloropropane boils at 15° C. and will normally be contained in and conveniently administered from a vessel or holder for example a cylinder under pressure. The 1:1:1:3:3:3-hexafluoro-2-bromopropane boils at 31° C. and is conveniently stored in containers normally used for related inhalant anaesthetics of comparable boiling point for example ether and halothane.

It will be appreciated that the 1:1:1:3:3:3-hexafluoro-2-halopropane used for anaesthetic purposes should be free from any toxic impurities which may be present according to the particular process used for its manufacture. The inhalant anaesthetic compositions of the invention may, if desired, be admixed with other pharmaceutically-acceptable materials for example stabilisers and the like. As stabilisers there may be used for example a volatile agent such as ethanol which is physiologically tolerable or a non-volatile agent which is not carried over during vaporisation such as thymol.

The inhalant anaesthetic compositions of the invention may likewise contain, if desired, one or more known inhalant anaesthetics for example ether, chloroform, nitrous oxide, ethylene, trichloroethylene, cyclopropane, halothane, divinyl ether and trifluoroethyl vinyl ether.

The anaesthetic agent is preferably administered by inhalation in admixture with at least one other constituent comprising oxygen preferably in controlled amounts of a gaseous vehicle. Thus the anaesthetic agent is vapourised and mixed with oxygen, supplied for example either as pure oxygen or as air, to form a gaseous inhalant anaesthetic composition containing a sufficient proportion of the anaesthetic agent to produce the desired depth of anaesthesia and a sufficient proportion of oxygen to maintain adequate respiration. The anaesthetic agent vapour and the oxygen or gaseous mixture containing oxygen may be premixed or they may be mixed during administration to provide the desired proportion of the anaesthetic agent and oxygen in the lungs.

The inhalant anaesthetic compositions of the invention containing 1:1:1:3:3:3-hexafluoro-2-chloropropane as the anaesthetic agent are preferably so admixed with oxygen or a gaseous mixture containing oxygen that there is present between 2 and 40% by volume of 1:1:1:3:3:3-hexafluoro-2-chloropropane. The inhalant anaesthetic compositions of the invention containing 1:1:1:3:3:3-hexafluoro-2-bromopropane as the anaesthetic agent are preferably so admixed with oxygen or a gaseous mixture containing oxygen that there is present between 1 and 20% by volume of 1:1:1:3:3:3-hexafluoro-2-bromopropane.

The margin of safety in using 1:1:1:3:3:3-hexafluoro-2-chloropropane as an inhalation anaesthetic, as measured in mice, is relatively high. The $AC_{50}$, the minimum concentration by volume needed to produce full anaesthesia in 50% of the test mice in 30 minutes is 7–8% and the $LC_{50}$, the minimum concentration by volume of vapour needed to kill 50% of the test mice in 30 minutes is about 20–30%. Thus the margin of safety as measured in mice by the $LC_{50}/AC_{50}$ ratio is of the order of 3–4. Under the same conditions the $LC_{50}/AC_{50}$ ratio of ether is 1.77 and that of chloroform is 1.75. Furthermore administration of 1:1:1:3:3:3-hexafluoro-2-chloropropane to rabbits to produce anaesthesia is not accompanied by any changes in respiration or in blood pressure or by cardiac irregularities as shown by electrocardiographic tracings.

In mice, the $AC_{50}$ of 1:1:1:3:3:3-hexafluoro-2-bromopropane is 1.7% and the $LC_{50}$ is 7.9%. Thus the margin of safety as measured in mice by the $LC_{50}/AC_{50}$ ratio is of the order of 4.5. Administration to rabbits in a concentration of 4.8% produces anaesthesia in less than 5 minutes and this anaesthesia is not accompanied by any changes in blood pressure or by cardiac irregularities or by any effects on the lungs. Administration to dogs at a concentration of 4.8% produces anaesthesia in 2 minutes and this anaesthesia can be maintained satisfactorily at a concentration of 2.4%. Anaesthesia under these conditions in dogs is not accompanied by blood pressure changes, by cardiac irregularities or by changes in the lungs.

The invention is illustrated in its simplest form by the following examples:

Example 1

10 volumes of 1:1:1:3:3:3-hexafluoro-2-chloropropane in the vapour state and 90 volumes of air are mixed and the mixture so obtained is administered to mice by means of apparatus normally used for the administration of an inhalation anaesthetic. The mice are anaesthetised in about 2 to 5 minutes and no undesirable side effects are observed.

Example 2

4.8 volumes of 1:1:1:3:3:3-hexafluoro-2-bromopropane in the vapour state and 95.2 volumes of air are mixed and the mixture so obtained is administered to rabbits by means of apparatus normally used for the administration of an inhalation anaesthetic. The rabbits are rapidly anaesthetised and no undesirable side-effects are observed.

Example 3

A mixture as described in Example 2 is administered to dogs and anaesthesia is produced smoothly and rapidly. The composition of the gaseous mixture is then adjusted so that the mixture comprises 2.4 volumes of 1:1:1:3:3:3-hexafluoro-2-bromopropane to 97.6 volumes of air. Anaesthesia is thus maintained at a satisfactory level.

What we claim is:

1. Inhalant anaesthetic compositions comprising a 1:1:1:3:3:3-hexafluoro-2-halopropane of the formula $CF_3CHXCF_3$, wherein X stands for a member of the group consisting of chlorine and bromine atoms, in admixture with oxygen in suitable proportions for the production of anaesthesia.

2. Compositions as claimed in claim 1 containing 1:1:1:3:3:3-hexafluoro-2-bromopropane wherein there is present between 1 and 20% by volume of 1:1:1:3:33-hexafluoro-2-bromopropane in admixture with oxygen or a gaseous mixture containing oxygen.

3. Compositions as claimed in claim 1 wherein the oxygen is present as a gaseous mixture containing oxygen in amount capable of supporting respiration.

4. Compositions as claimed in claim 3 wherein the gas mixture is air.

5. A process for the production of anaesthesia which comprises administration of an inhalant anaesthetic composition, claimed in claim 1, in sufficient amount to produce the desired depth of anaesthesia whilst at the same time maintaining adequate respiration.

6. Process as claimed in claim 5 wherein the anaesthetic agent vapour and the oxygen are premixed.

7. Process as claimed in claim 5 wherein the anaesthetic agent vapor and the oxygen are admixed during administration.

References Cited in the file of this patent

UNITED STATES PATENTS

| | | |
|---|---|---|
| 2,637,747 | McBee | May 5, 1953 |
| 2,644,845 | McBee | July 7, 1953 |